United States Patent
Chen et al.

(10) Patent No.: US 10,691,890 B2
(45) Date of Patent: Jun. 23, 2020

(54) WORD SEGMENTATION METHOD AND SYSTEM FOR LANGUAGE TEXT

(71) Applicant: Huawei Technologies Co., Ltd., Shenzhen (CN)

(72) Inventors: Xiao Chen, Hong Kong (HK); Hang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/134,393

(22) Filed: Sep. 18, 2018

(65) Prior Publication Data

US 2019/0018836 A1 Jan. 17, 2019

Related U.S. Application Data

(63) Continuation of application No. PCT/CN2017/077830, filed on Mar. 23, 2017.

(30) Foreign Application Priority Data

Apr. 12, 2016 (CN) .......................... 2016 1 0225943

(51) Int. Cl.
*G06F 17/27* (2006.01)
*G06F 17/28* (2006.01)
(Continued)

(52) U.S. Cl.
CPC ............ *G06F 40/284* (2020.01); *G06F 40/53* (2020.01)

(58) Field of Classification Search
CPC ........... G06F 17/27; G06F 17/28; G06F 17/30
See application file for complete search history.

(56) References Cited

U.S. PATENT DOCUMENTS

| 2009/0326916 A1 | 12/2009 | Gao et al. |
| 2015/0100307 A1 | 4/2015 | Sun et al. |

(Continued)

FOREIGN PATENT DOCUMENTS

| CN | 100504851 C | 6/2009 |
| CN | 102479191 A | 5/2012 |

(Continued)

OTHER PUBLICATIONS

Machine Translation and Abstract of Chinese Publication No. CN100504851, Jun. 24, 2009, 14 pages.

(Continued)

*Primary Examiner* — Shreyans A Patel
(74) *Attorney, Agent, or Firm* — Conley Rose, P.C.

(57) ABSTRACT

A word segmentation method and system for a language text, where in the method, a word segmentation is performed on the first language text in a first word segmentation manner to obtain a first word boundary set, the first word boundary set is divided into a trusted second word boundary set and an untrusted third word boundary set according to a confidence level threshold, a second language text is selected from the first language text according to the third word boundary set, and a word segmentation is performed on the second language text in a second word segmentation manner to obtain a fourth word boundary set. Word segmentation precision of the first language text can be flexibly adjusted by adjusting the confidence level threshold.

20 Claims, 6 Drawing Sheets

(51) Int. Cl.
G06F 40/284 (2020.01)
G06F 40/53 (2020.01)

(56) References Cited

U.S. PATENT DOCUMENTS

| | | | |
|---|---|---|---|
| 2016/0026618 | A1 | 1/2016 | Bangalore et al. |
| 2016/0117595 | A1* | 4/2016 | Zhang .................... G06Q 10/10 706/12 |
| 2016/0269326 | A1* | 9/2016 | Ji ............................ H04L 51/02 |
| 2017/0011117 | A1* | 1/2017 | Jiang ................... G06F 17/2795 |
| 2017/0124064 | A1* | 5/2017 | Lu ........................ G06F 17/248 |
| 2018/0157634 | A1* | 6/2018 | Tu ......................... G06F 17/271 |
| 2019/0018836 | A1* | 1/2019 | Chen ................... G06F 17/2863 |
| 2019/0138606 | A1* | 5/2019 | Tu ....................... G06F 17/2845 |
| 2019/0303768 | A1* | 10/2019 | Zhang .................... G06N 20/00 |

FOREIGN PATENT DOCUMENTS

| | | |
|---|---|---|
| CN | 102693219 A | 9/2012 |
| CN | 103324612 A | 9/2013 |
| CN | 104317882 A | 1/2015 |
| CN | 104866472 A | 8/2015 |
| CN | 104899190 A | 9/2015 |

OTHER PUBLICATIONS

Machine Translation and Abstract of Chinese Publication No. CN103324612, Sep. 25, 2013, 21 pages.
Machine Translation and Abstract of Chinese Publication No. CN104317882, Jan. 28, 2015, 13 pages.
Machine Translation and Abstract of Chinese Publication No. CN104866472, Aug. 26, 2015, 26 pages.
Machine Translation and Abstract of Chinese Publication No. CN104899190, Sep. 9, 2015, 35 pages.
Foreign Communication From a Counterpart Application, PCT Application No. PCT/CN2017/077830, English Translation of International Search Report dated Jun. 22, 2017, 2 pages.
Foreign Communication From a Counterpart Application, PCT Application No. PCT/CN2017/077830, English Translation of Written Opinion dated Jun. 22, 2017, 5 pages.
Qiao, W., et al., "Incorporate Web Search Technology to Solve Out-of-Vocabulary Words in Chinese Word Segmentation," XP055559011, Proceedings of the 23rd Pacific Asia Conference on Language, Information and Computation, Aug. pp. 454-463.
Roth, D., "CS 546 Machine Learning in NLP," XP055559052, Department of Computer Science University of Illinois at Urbana-Champaign, USA, Feb. 21, 2016, 96 pages.
Foreign Communication From a Counterpart Application, European Application No. 17781785.5, Extended European Search Report dated Feb. 28, 2019, 8 pages.
Machine Translation and Abstract of Chinese Publication No. CN102693219, dated Sep. 26, 2012, 22 pages.
Liu, Z., et al. "Chinese word segmentation method for short Chinese text based on conditional random fields," Journal of Tsinghua University (Science and Technology), Aug. 2015, 6 pages.
English Translation of Liu, Z., et al. "Chinese word segmentation method for short Chinese text based on conditional random fields," Journal of Tsinghua University (Science and Technology), Aug. 2015, 8 pages.

* cited by examiner

Shi chang zhong guo you qi ye

Word segmentation training corpus

WORD SEGMENTATION METHOD AND SYSTEM FOR LANGUAGE TEXT

CROSS-REFERENCE TO RELATED APPLICATIONS

This application is a continuation of International Patent Application No. PCT/CN2017/077830 filed on Mar. 23, 2017, which claims priority to Chinese Patent Application No. 201610225943.3 filed on Apr. 12, 2016. The disclosures of the aforementioned applications are hereby incorporated by reference in their entireties.

TECHNICAL FIELD

This application relates to the field of natural language processing, and in particular, to a word segmentation method and system for a language text.

BACKGROUND

Word segmentation is one of basic issues of natural language processing. Word segmentation needs to be performed on all languages (such as Chinese, Japanese, and Arabic) with no word boundary mark. A word segmentation system is widely used in fields such as information retrieval, machine translation, and a question answering system.

Different applications have different requirements on an output of a word segmentation system. For example, an information retrieval system requires a relatively high word segmentation speed and consistency. However, the information retrieval system requires relatively low word segmentation correctness, for example, requires a relatively low recognition rate for an unrecorded word (a word that is not recorded in a word segmentation system). On the contrary, a machine translation system requires relatively high word segmentation correctness, but requires relatively low word segmentation consistency. For example, a string "Jiang Wenyuan" is an unrecorded word. In an information retrieval application, if a word segmentation system segments "Jiang Wenyuan" into two words "Jiang" and "Wenyuan", instead of one word "Jiang Wenyuan", the information retrieval system can find a related document by means of retrieval provided that the word segmentation system ensures that all "Jiang Wenyuan" in the document is segmented in a same manner. In comparison, in the machine translation system, if the string "Jiang Wenyuan" is segmented into "Jiang" and "Wenyuan", the word "Jiang" may be incorrectly translated into an English word "ginger". Consequently, a translation result of the machine translation system is inaccurate.

All current word segmentation systems can meet a requirement of only a particular application, and are difficult to be reused in different application scenarios. In consideration that some companies and organizations in the industry need to use a word segmentation system in different application scenarios, a solution usually used by the companies and the organizations is customizing different word segmentation systems for different applications. This manner causes resource waste and a system maintenance difficulty.

SUMMARY

This application provides a word segmentation method and system for a language text that can adapt to different requirements on a word segmentation system in multiple application scenarios.

According to a first aspect, a word segmentation method for a language text is provided, including obtaining a first language text to be processed and a confidence level threshold, where the confidence level threshold is used to indicate word segmentation precision required by the first language text, performing word segmentation on the first language text in a first word segmentation manner to obtain a first word boundary set, dividing, according to the confidence level threshold, the first word boundary set into a trusted second word boundary set and an untrusted third word boundary set, selecting a second language text from the first language text according to the third word boundary set, where the second language text includes a word corresponding to each word boundary in the third word boundary set, performing word segmentation on the second language text in a second word segmentation manner to obtain a fourth word boundary set, where word segmentation precision of the second word segmentation manner is higher than word segmentation precision of the first word segmentation manner, and setting the second word boundary set and the fourth word boundary set as a word segmentation result of the first language text.

Word segmentation precision required by the first language text can be flexibly adjusted by adjusting the confidence level threshold in order to adapt to multiple application scenarios requiring different word segmentation precision. For example, in a scenario requiring relatively high word segmentation precision, a user may enter a relatively large confidence level threshold, and in a scenario requiring relatively low word segmentation precision, the user may enter a relatively small confidence level threshold.

With reference to the first aspect, in a first implementation of the first aspect, dividing, according to the confidence level threshold, the first word boundary set into a trusted second word boundary set and an untrusted third word boundary set includes selecting, from a context of each word boundary in the first word boundary set, at least one word corresponding to each word boundary, extracting a feature of the at least one word corresponding to each word boundary, determining, according to the feature of the at least one word corresponding to each word boundary, a confidence level of each word boundary in the context using a classifier obtained by means of training in advance, adding, to the second word boundary set, a word boundary that is in the first word boundary set and whose confidence level is greater than the confidence level threshold, and adding, to the third word boundary set, a word boundary that is in the first word boundary set and whose confidence level is less than or equal to the confidence level threshold.

Rapid classification of the first word boundary set can be implemented using the classifier obtained by means of training in advance.

With reference to the first implementation of the first aspect, in a second implementation of the first aspect, determining, according to the feature of the at least one word corresponding to each word boundary, a confidence level of each word boundary in the context using a classifier obtained by means of training in advance includes determining the confidence level of each word boundary in the context according to $$P(\text{True} | B_i, c) = \frac{S(\text{True}, B_i, c)}{\sum_t S(t, B_i, c)},$$

where $P(\text{True}|B_i,c)$ represents a confidence level, in the context c, of an $i^{th}$ word boundary $B_i$ in the first word boundary set, $S(t,B_i,c)$ represents a score of the $i^{th}$ word boundary $B_i$ in the context c, and $$S(t, B_i, c) = \sum_j \beta_j f_j(t, B_i, c),$$

where $f_j(t,B_i,c)$ represents a $j^{th}$ feature in the feature of the at least one word, $\beta_j$ represents a parameter of the classifier, and t represents a class corresponding to the classifier, and t∈{True,False}.

A linear classifier can speed up classification of a word boundary.

With reference to either of the first and the second implementations of the first aspect, in a third implementation of the first aspect, selecting, from a context of each word boundary in the first word boundary set, at least one word corresponding to each word boundary includes selecting, from the context of each word boundary, a word corresponding to each word boundary, a word previous to the word corresponding to each word boundary, and a word next to the word corresponding to each word boundary.

With reference to any one of the first to the third implementations of the first aspect, in a fourth implementation of the first aspect, the parameter of the classifier is a parameter obtained by means of training based on a target language text, and the target language text is a language text obtained after word segmentation is performed in the first word segmentation manner on a language text whose word boundary is known.

Word segmentation is performed in the first word segmentation manner on the language text whose word boundary is known, to obtain the target language text, and the parameter of the classifier is trained based on the target language text. In this way, the parameter of the classifier conforms to an actual situation (in practice, word segmentation is first performed in the first word segmentation manner on each language text on which word segmentation is to be performed) to a greater extent, and the trained classifier is more accurate.

With reference to any one of the first to the fourth implementations of the first aspect, in a fifth implementation of the first aspect, selecting at least one word from a context of each word boundary in the first word boundary set includes determining the context of each word boundary according to a position of the word boundary in the first language text, and selecting the at least one word from the context.

According to a second aspect, a word segmentation system for a language text is provided, including a module that can perform the method in the first aspect.

According to a third aspect, a word segmentation system for a language text is provided, including a memory configured to store a program, and a processor configured to execute the program, and when the program is executed, the processor performs the method in the first aspect.

According to a fourth aspect, a computer readable medium is provided, where the computer readable medium stores program code executed by a word segmentation system, and the program code includes an instruction for performing the method in the first aspect.

In some implementations, features corresponding to each of the at least one word include a word length of each word, overheads corresponding to each word, a type of each word in a dictionary, a rhythm of each word, whether each word includes an affix, and whether each word includes a case mark. The overheads corresponding to each word are overheads of each word in a word path. The word path is a word path generated by a word segmentation result obtained after word segmentation is performed in the first word segmentation manner.

In some implementations, the classifier may be a linear classifier. In an example, a parameter of the linear classifier is a weight of each of the features of the at least one word. The linear classifier may reduce calculation complexity.

In some implementations, the confidence level threshold may be used to indicate a word segmentation speed required by the first language text.

In some implementations, a word segmentation speed of the first word segmentation manner may be higher than a word segmentation speed of the second word segmentation manner.

In some implementations, a word corresponding to a word boundary may be a word segmented by the word boundary, and may be, for example, a word previous to the word boundary in a word segmentation result.

In some implementations, the parameter of the classifier is a parameter obtained by means of training based on a target language text. The target language text is a language text obtained by comparing a manually marked word boundary set with a word boundary set obtained after word segmentation is performed in the first word segmentation manner on a language text whose word boundary is known.

In some implementations, training data of the parameter of the classifier includes a language text used for training, a known word boundary set of the language text, and a word boundary set obtained after word segmentation is performed on the language text in the first word segmentation manner.

In some implementations, the context of each word boundary may be a context of each word in the first language text, and may include, for example, a word on the left of a first word boundary and/or a word on the right of a first word boundary in the first language text.

DESCRIPTION OF EMBODIMENTS

For ease of understanding, a first word segmentation manner is referred to as a simple word segmentation manner below, and a module corresponding to the simple word segmentation manner is referred to as a simple word segmentation module. In the simple word segmentation manner, a word segmentation algorithm having a high word segmentation speed and high word segmentation consistency may be used, and includes but is not limited to a shortest-path word segmentation algorithm. A second word segmentation manner is referred to as a complex word segmentation manner, and a module corresponding to the complex word segmentation manner is referred to as a complex word segmentation module. In the complex word segmentation manner, a word segmentation algorithm having high accuracy and high algorithm complexity may be used, and includes but is not limited to a word segmentation algorithm based on a word marking method.

Figure 1:
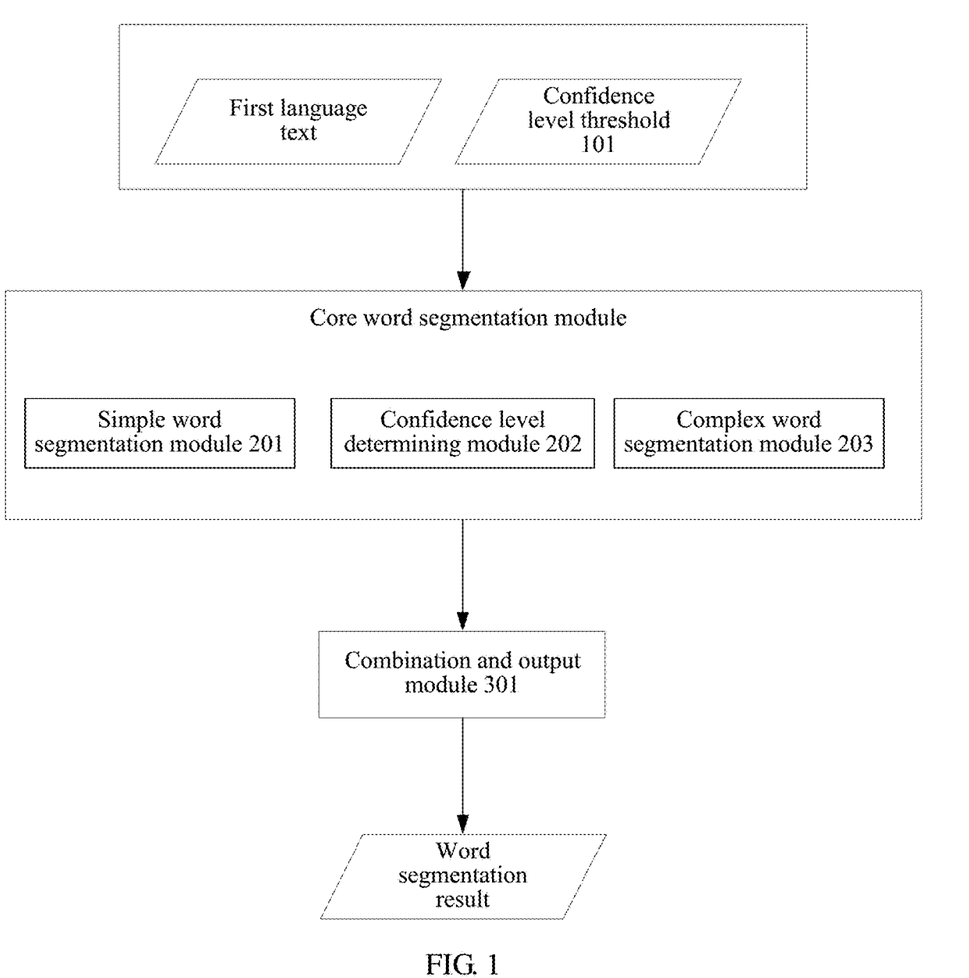
FIG. 1 is a structural diagram of an example of a word segmentation system according to an embodiment of this application.

FIG. 1 is a structural diagram of an example of a word segmentation system according to an embodiment of this application. Referring to FIG. 1, on the whole, an input of the word segmentation system includes not only an entered first language text but also a confidence level threshold 101. An output of the word segmentation system is a word segmentation result obtained by segmenting the first language text based on the confidence level threshold 101. The following describes functions of modules in detail.

The confidence level threshold 101 is a parameter entered by a user, and is a threshold used by a confidence level determining module to determine whether current segmentation of a simple word segmentation module is trusted. For example, the confidence level threshold may be a real number ranging from 0 to 1, and values of the confidence level threshold of the word segmentation system may be different in different application scenarios. For example, an information retrieval system requires a relatively high word segmentation speed and consistency. Therefore, the confidence level threshold may be set to a relatively small value (such as a value less than 0.5). However, a machine translation system requires relatively high word segmentation correctness. Therefore, the confidence level threshold may be set to a relatively large value (such as a value greater than 0.7).

In some embodiments, a confidence level determining module 202 may determine whether a word segmentation result outputted by a simple word segmentation module 201 is trusted. The confidence level determining module 202 may be a classifier obtained by means of training in advance. The classifier may be a linear classifier, or may not be a non-linear classifier.

In some embodiments, a combination and output module 301 may be a module that combines word segmentation results of the simple word segmentation module 201 and a complex word segmentation module 203, and outputs a result obtained after combination.

Figure 2:
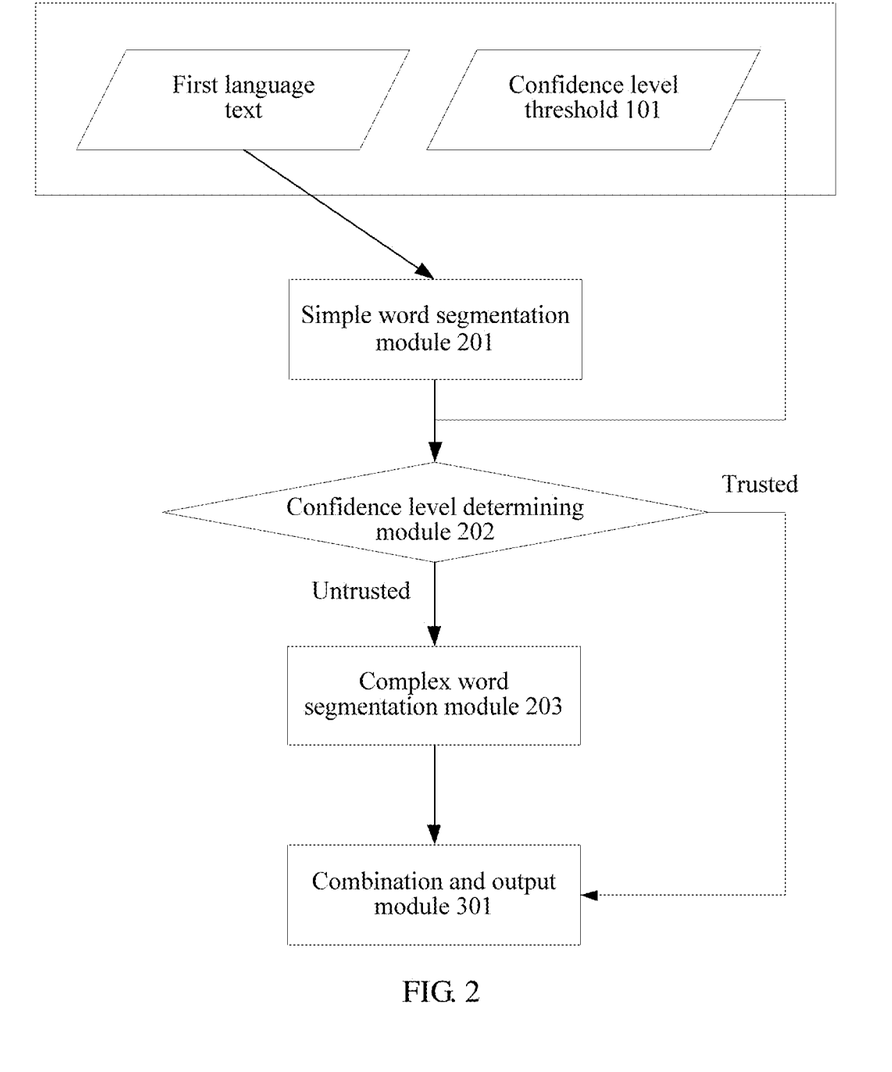
FIG. 2 is a schematic diagram of a word segmentation procedure according to an embodiment of this application.

It can be seen from FIG. 1 that a core word segmentation module includes three modules, the simple word segmentation module 201, the confidence level determining module 202, and the complex word segmentation module 203. FIG. 2 is used as an example below to describe a word segmentation procedure based on the three modules.

Further, a first language text entered by a user is first segmented by the simple word segmentation module to obtain a first word boundary set. Then, a word segmentation result of the simple word segmentation module 201 may be sent to the confidence level determining module 202 together with the confidence level threshold 101 entered by the user. The confidence level determining module 202 may determine a confidence level of each word boundary in the first word boundary set, and divide the first word boundary set into a trusted word boundary set and an untrusted word boundary set. The trusted word boundary set may be directly sent to the combination and output module 301 and used as a final word segmentation output. The untrusted word boundary set may be sent to the complex word segmentation module 203 for further segmentation, and then the complex word segmentation module 203 outputs a segmentation result to the combination and output module 301. The combination and output module 301 combines the segmentation result with the trusted word boundary set, and outputs a result obtained after combination as a final result of the first language text.

In some embodiments, a feasible technical solution of the simple word segmentation module 201 is as follows. A word segmentation manner based on a dictionary is used, and ambiguity is removed using a language model and a rule of fewest segmented words.

Figure 3:
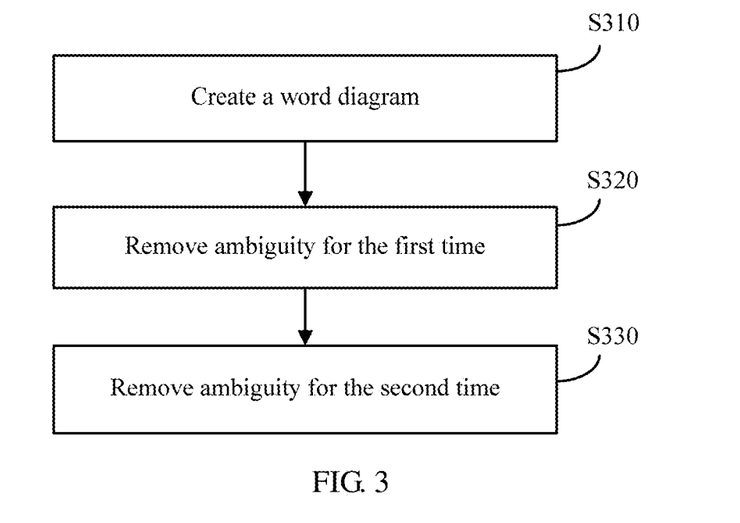
FIG. 3 is a schematic flowchart of performing simple word segmentation on a language text according to an embodiment of this application.

In some embodiments, the simple word segmentation module 201 may perform word segmentation on the first language text according to a procedure shown in FIG. 3.

Step S310: Create a word diagram.

Figure 4:
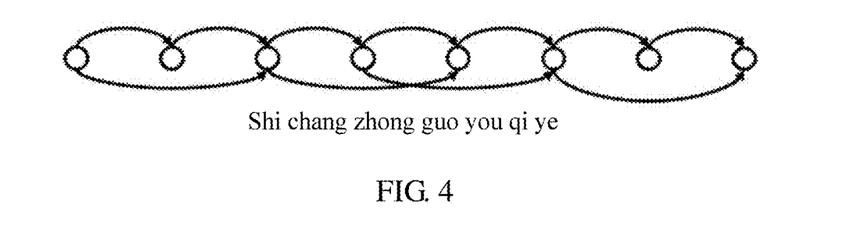
FIG. 4 is a diagram of an example of a word diagram.

Further, word segmentation may be performed on the first language text using a dictionary, and a word diagram corresponding to a word segmentation result is created. For example, the first language text is "shi chang zhong guo you qi ye", and a word diagram shown in FIG. 4 may be created. It can be seen from FIG. 4 that, there are two crossed sides above a text "zhong guo you". This case is referred to as word segmentation ambiguity. The ambiguity is removed in the following steps.

Step S320: Remove ambiguity for the first time.

In some embodiments, a shortest path may be found in the word diagram using a shortest-path searching method, that is, a path having fewest sides from a leftmost node to a rightmost node. If there is a unique shortest path, a word segmentation result represented by the path is used as a word segmentation result of the simple word segmentation module 201.

Step S330: Remove ambiguity for the second time.

In some embodiments, if it is found, by means of shortest-path searching in step S320, that there are multiple shortest paths in the word diagram, a path having fewest overheads may be searched for by calculating overheads of the paths, and the path having fewest overheads is used as a word segmentation result of the simple word segmentation module 201.

In some embodiments, path overheads may be calculated using a unary language model. The unary language model may be represented by the following formulas:

$$C(S) = \sum_{w \in S} C(w); \text{ and} \quad (1)$$

$$C(w) = -\log(P(w)). \quad (2)$$

Overheads C(S) of a sentence S may be equal to a sum of overheads of all words w in the sentence. Overheads C(w) of a word w are calculated using a probability P(w) of w in the unary language model.

In some embodiments, both the dictionary and the unary language model may be obtained from a word segmentation training corpus. It should be understood that, an implementation of the simple word segmentation module 201 includes but is not limited to the foregoing technical solution. Any word segmentation manner having low calculation complexity, a high speed, and relatively high segmentation consistency may be used as an implementation of the simple word segmentation module 201.

In some embodiments, a feasible technical solution of the confidence level determining module 202 is a linear classifier. The linear classifier classifies word boundaries in the first word boundary set using features extracted from contexts of the word boundaries, calculates confidence levels of the word boundaries in the first word boundary set, and compares the confidence levels of the word boundaries in the first word boundary set with the confidence level threshold 101 to determine whether the word boundaries are trusted.

Figure 5:
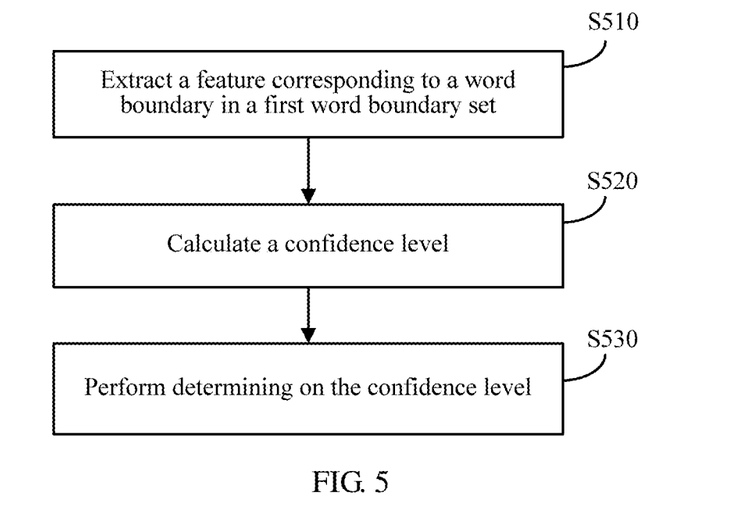
FIG. 5 is a schematic flowchart of performing complex word segmentation on a language text according to an embodiment of this application.

In some embodiments, the confidence level determining module 202 may divide, using an algorithm shown in FIG. 5, the word boundaries in the first word boundary set into a trusted word boundary set and an untrusted word boundary set.

Step S510: Extract a feature corresponding to a word boundary in the first word boundary set.

Assuming that an $i^{th}$ word boundary in the first word boundary set is $B_i$, and $B_i$ corresponds to a word $W_i$. The confidence level determining module 202 may extract the following features from a context of $B_i$, a word length of the current word $W_i$, a word length of a previous word $W_{i-1}$, and a word length of a next word $W_{i+1}$, overheads of $W_i$, overheads of $W_{i-1}$, and overheads of $W_{i-1}$, types (such as a person name, a place name, an organization name, and the like) of $W_i$, $W_{i-1}$, and $W_{i+1}$ in a dictionary, other features (for example, a rhythm, whether an affix is included, and whether a case mark is included) of $W_i$, $W_{i-1}$, and $W_{i+1}$, and various combinations of the foregoing features.

Step S520: Calculate a confidence level.

In some embodiments, a confidence level of the word boundary $B_i$ may be calculated using a linear classifier:

$$P(\text{True} \mid B_i, c) = \frac{S(\text{True}, B_i, c)}{\sum_{t \in \{\text{True}, \text{False}\}} S(t, B_i, c)}; \text{ and} \quad (3)$$

$$S(t, B_i, c) = \sum_j \beta_j f_j(t, B_i, c), t \in \{\text{True}, \text{False}\}. \quad (4)$$

where j may represent a subscript of a feature used by the linear classifier, $f_j(t,B_i,c)$ may represent a $j^{th}$ feature in the features corresponding to the word boundary $B_i$, $\beta_j$ may represent a parameter of the classifier, $S(t,B_i,c)$ may represent a score provided by the linear classifier to the word boundary $B_i$, and t may represent a class corresponding to the classifier. The confidence level $P(\text{True} \mid B_i,c)$ (in this embodiment of this application, the confidence level may be represented by a trusted probability P) of the word boundary $B_i$ can be obtained by normalizing the score according to the formula (3).

Step S530: Perform determining on the confidence level.

It is assumed that the confidence level threshold 101 is h. If $P(\text{True}\mid B_i,c)>h$, $B_i$ is trusted and is transferred to the combination and output module 301, or if $P(\text{True}\mid B_i,c)\leq h$, $B_i$ is untrusted and is transferred to the complex word segmentation module 203.

In some embodiments, before the linear classifier is used, the parameter $\beta_j$ of the classifier needs to be trained (that is, a weight corresponding to each feature is trained). For example, the parameter $\beta_j$ of the classifier may be obtained by means of training based on a training data set in a machine learning manner.

In some embodiments, a target language text used to train a parameter of a classifier may be obtained after simple word segmentation is performed on a language text (referred to as a word segmentation training corpus below) whose word boundary is known. For a process of creating the target language text, refer to FIG. 6.

Figure 6:
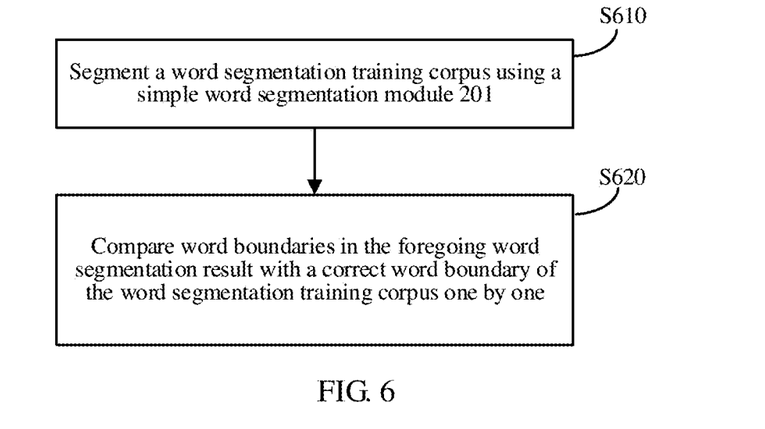
FIG. 6 is a schematic flowchart of a process of training a classifier according to an embodiment of this application.

Step S610: Segment a word segmentation training corpus using the simple word segmentation module 201.

In some embodiments, first, a word boundary mark in the word segmentation training corpus may be removed, to obtain a language text having no mark. Then, the text may be segmented using the simple word segmentation module 201 to obtain a word segmentation result of the simple word segmentation module 201.

Step S620: Compare word boundaries in the foregoing word segmentation result with a correct word boundary of the word segmentation training corpus one by one.

Figure 7:
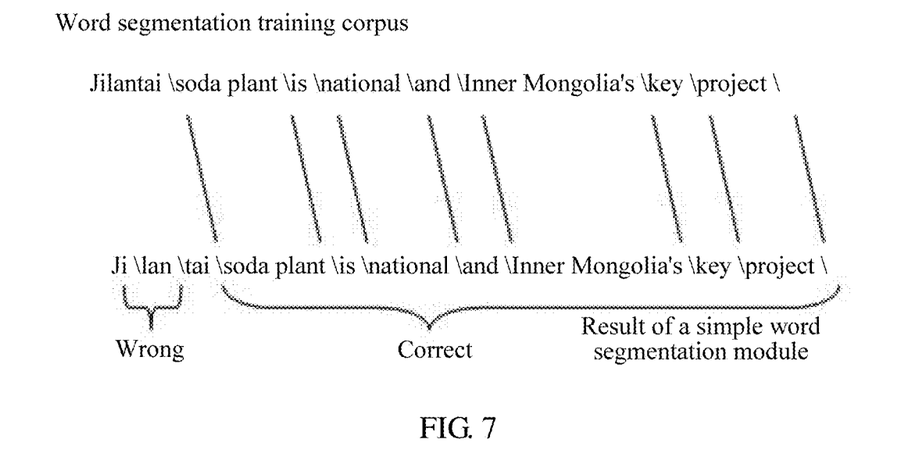
FIG. 7 is a diagram of an example of a target language text according to an embodiment of this application.

A word boundary set outputted by the simple word segmentation module 201 may be obtained using step S620. Each word boundary in the word boundary set has a mark indicating whether the word boundary is correct. In this way, a target language text required to train a classifier is obtained. FIG. 7 shows an example of creating a target language text.

Further, after the foregoing training data is obtained, the classifier may be trained using a standard training method to obtain a parameter of the classifier.

Figure 8:
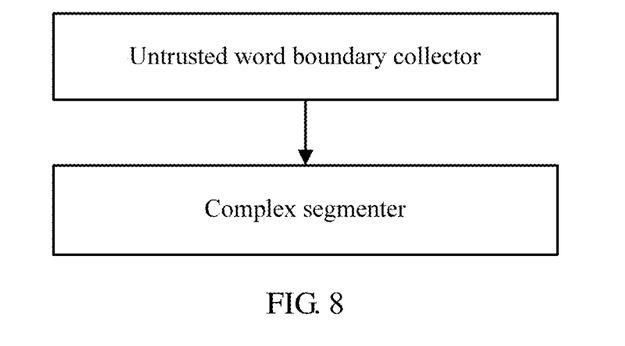
FIG. 8 is a schematic structural diagram of a complex word segmentation module according to an embodiment of this application.

In some embodiments, the complex word segmentation module 203 may include two parts, as shown in FIG. 8.

In some embodiments, an untrusted word boundary collector may be responsible for collecting consecutive untrusted word boundaries. Using "Snow/den/" as an example, language text segments segmented by the untrusted word boundaries may be combined to obtain "Snowden", and the "Snowden" is used as an input of a complex segmenter.

Figure 9:
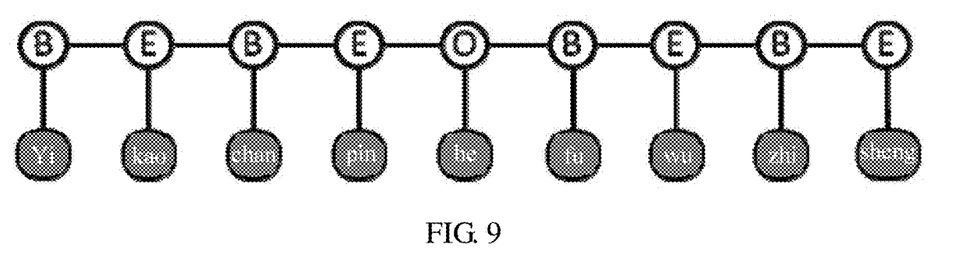
FIG. 9 is a diagram of an example of a word segmentation manner based on a mark according to an embodiment of this application.

In some embodiments, the complex segmenter may use a word segmentation manner based on word marking. A general principle of the word segmentation manner is converting word segmentation of a language text into allocation of a mark to each word in the language text. Referring to FIG. 9, B, E, and O in FIG. 9 may respectively represent a position of a character in a word. O may represent a word having a single character. B may represent a character header of a multi-character word, that is, the first character of the word. E may represent another position other than a character header of a multi-character word.

In some embodiments, the complex segmenter (shown in FIG. 8) may use the following training manner.

First, a training corpus having a word segmentation mark may be converted into a Chinese word and a word position mark, as shown in FIG. 9.

Second, a mark allocated to each word in a particular context may be learned of using a machine learning model (a maximum-entropy model, a conditional random field model, a structured perceptron, or the like).

In some embodiments, the complex segmenter may use the following word segmentation manner.

First, a mark may be allocated to each word in an entered sentence using a parameter, of the complex segmenter, obtained by means of training in a training manner.

Then, how to perform word segmentation is determined according to the mark of each word.

It should be understood that, a manner of implementing the complex word segmentation module 203 is not limited in this embodiment of this application. Any word segmentation manner or algorithm having high accuracy and a high unrecorded word recognition capability can be used as an implementation solution of the complex word segmentation module 203.

In some embodiments, the confidence level threshold 101 may be a continuous variable, for example, may be provided by a user of a word segmentation system, and is sent to the word segmentation system together with the first language text. The variable may represent a requirement on a word segmentation result in an application scenario. For example, an information retrieval scenario requires that the word segmentation result is generated quickly and is highly consistent, a machine translation scenario or an automatic question answering scenario requires that the word segmentation result is highly accurate. In an example, the confidence level threshold may be set to a real number ranging from 0 to 1.

Figure 10:
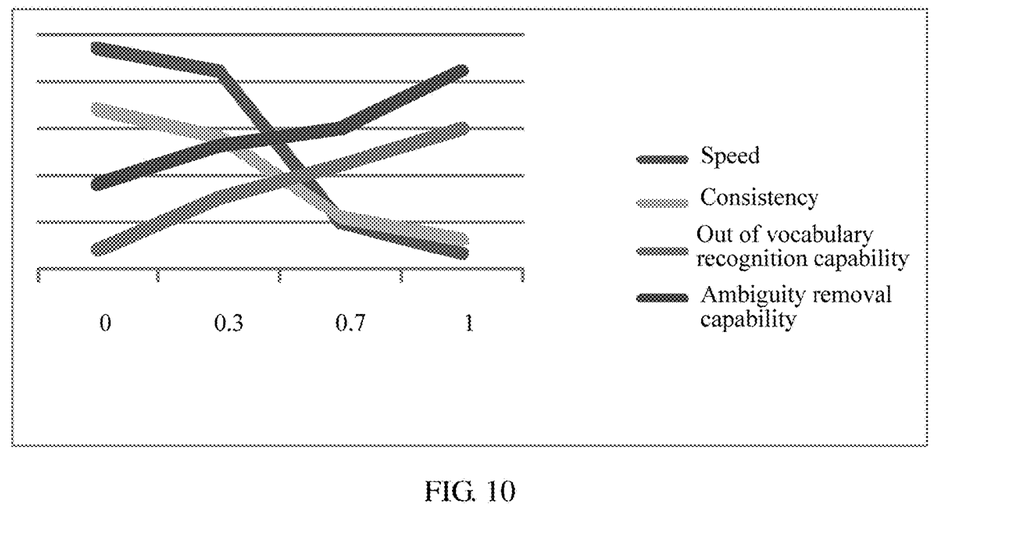
FIG. 10 is a curve diagram of an effect of a confidence level threshold on a word segmentation result according to an embodiment of this application.

FIG. 10 shows an effect of the confidence level threshold on a word segmentation result. It can be seen from FIG. 10 that, if the confidence level threshold is larger, an unrecorded word recognition capability is stronger, an ambiguity removal capability is stronger, and a word segmentation result is more correct, but a word segmentation speed and word segmentation consistency are lower. If the confidence level threshold is smaller, the word segmentation speed and word segmentation consistency are higher, but the unrecorded word recognition capability and the ambiguity removal capability are weaker, and word segmentation is less correct.

The following describes the embodiments of this application in further details using a specific example. It should be noted that the following example is merely intended to help a person skilled in the art to understand the embodiments of this application, and is not intended to limit the embodiments of this application to specific values or specific scenarios in the example. Obviously, a person skilled in the art may make various equivalent modifications or variations according to the given example. The modifications or variations also fall with the scope of the embodiments of this application.

It is assumed that a first language text to be processed is "Fan Denggao bian he Wang Xiaoju yue ding nian di zhi qian yi ding yao xiao ju yi ci." In an application scenario requiring relatively high consistency, a confidence level threshold h may be set to 0.2.

First, the following word segmentation result ("\" represents a word boundary) is obtained after the simple word segmentation module 201 performs word segmentation Fan\Denggao\bian\he\Wang\Xiaoju\yue ding\nian di\zhi qian\yi ding\yao\xiao ju\yi\ci\.\.

Then, the confidence level determining module 202 may determine a confidence level of each word boundary "\" in the word segmentation result.

For example, if $B_i$ represents an $i^{th}$ word boundary in the foregoing word segmentation result, the confidence level determining module 202 may calculate a probability $P(True|B_i,c)$ that the word boundary is trusted (True) in a context c. When $P(True|B_i,c)>h$, $B_i$ may be used as a trusted word boundary and transferred to the combination and output module 301. When $P(True|B_i,c)\leq h$, $B_i$ may be used as an untrusted word boundary and transferred to the complex word segmentation module 203 for processing. If the confidence level determining module 202 determines that word boundaries in the foregoing word segmentation result are all trusted word boundaries, the word segmentation result may be outputted to the combination and output module 301.

Then, the combination and output module 301 collates and outputs the word segmentation result.

A word segmentation result outputted by the combination and output module 301 may be Fan\Denggao\bian\he\Wang\Xiaoju\yue ding\nian di\zhi qian\yi ding\yao\xiao ju\yi\ci\.\.

In this embodiment, relatively high consistency is required on the word segmentation result. Therefore, a relatively small confidence level threshold is set (h=0.2). A final word segmentation result shows, (1) two unrecorded words "Fan Denggao" and "Wang Xiaoju" are not recognized, and (2) "xiao ju" in two segments "Wang Xiaoju" and "xiao ju yi ci" are segmented consistently.

For example, in the following description, the first language text is Fan Denggao bian he Wang Xiaoju yue ding nian di zhi qian yi ding yao xiao ju yi ci, and the confidence level threshold h=0.9.

The following word segmentation result ("/" represents an untrusted word boundary) is obtained after the confidence level determining module 202 performs word segmentation Fan/Denggao/bian\he\Wang/Xiaoju/yue ding\nian di\zhi qian\yi ding\yao\xiao ju\yi\ci\.\.

Next, an untrusted boundary collector collects consecutive untrusted boundaries in the foregoing result to form untrusted intervals (underlined parts in the following sentence example):

Fan/Denggao/bian\he\Wang/Xiaoju/yue ding\nian di\zhi qian\yi ding\yao\xiao ju\yi\ci\.\.

Then, the complex word segmentation module 203 performs word segmentation on each untrusted interval.

The two untrusted areas are recognized as person names after the complex word segmentation module 203 performs word segmentation.

Then, the combination and output module 301 collates and outputs the word segmentation result.

A word segmentation result outputted by the combination and output module 301 may be:

Fan Denggao\bian\he\Wang Xiaoju\yue ding\nian di\zhi qian\yi ding\yao\xiao ju\yi\ci\.\.

In this embodiment, the word segmentation result needs to have relatively highly correctness. Therefore, the confidence level threshold is set to a relatively large value (h=0.9). The word segmentation result shows that the two unrecorded words "Fan Denggao" and "Wang Xiaoju" are both recognized, but "xiaoju" in two segments "Wang Xiaoju" and "xiao ju yi ci" are not segmented consistently.

It should be understood that there may be one or more complex word segmentation modules in this embodiment of this application. When there are multiple complex word segmentation modules, an output of a previous complex word segmentation module may be used as an input of a next complex word segmentation module. In addition, before performing complex word segmentation, each complex word segmentation module may receive a new confidence level threshold.

The foregoing describes the word segmentation method for a language text according to the embodiments of this application in detail with reference to FIG. 1 to FIG. 10. The following describes a word segmentation system for a language text according to the embodiments of this application in detail with reference to FIG. 11 and FIG. 12. It should be understood that the word segmentation system in FIG. 11 or FIG. 12 can perform steps of the method described above. To avoid repetition, details are not described herein again.

Figure 11:
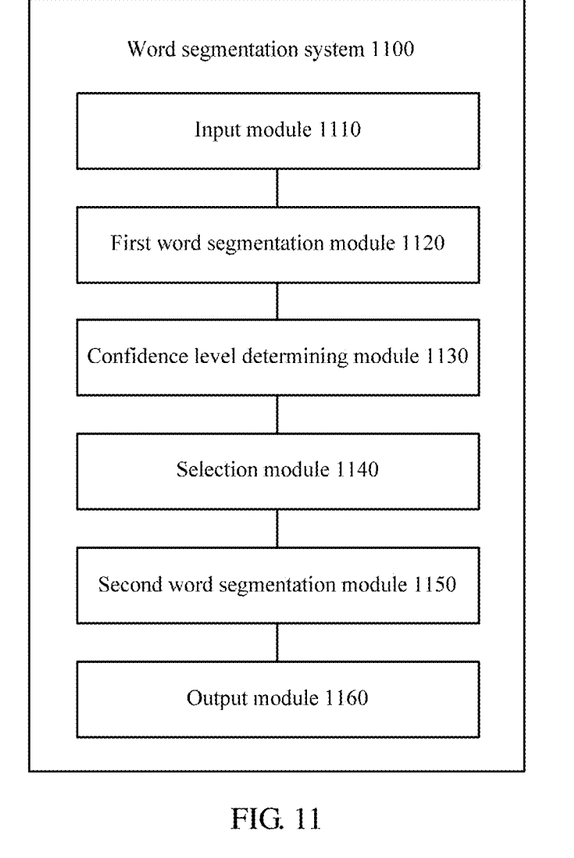
FIG. 11 is a schematic structural diagram of a word segmentation system for a language text according to an embodiment of this application.

FIG. 11 is a schematic structural diagram of a word segmentation system 1100 for a language text according to an embodiment of this application. The word segmentation system 1100 in FIG. 11 includes an input module 1110 configured to obtain a first language text to be processed and a confidence level threshold, where the confidence level threshold is used to indicate word segmentation precision, a word segmentation speed, or word segmentation consistency required by the first language text, a first word segmentation module 1120 configured to perform word segmentation on the first language text in a first word segmentation manner to obtain a first word boundary set, a confidence level determining module 1130 configured to divide, according to the confidence level threshold, the first word boundary set into a trusted second word boundary set and an untrusted third word boundary set, a selection module 1140 configured to select a second language text from the first language text according to the third word boundary set, where the second language text includes a word corresponding to each word boundary in the third word boundary set, a second word segmentation module 1150 configured to perform word segmentation on the second language text in a second word segmentation manner to obtain a fourth word boundary set, where word segmentation precision of the second word segmentation manner is higher than word segmentation precision of the first word segmentation manner, and an output module 1160 configured to determine the second word boundary set and the fourth word boundary set as a word segmentation result of the first language text.

Word segmentation precision required by the first language text can be flexibly adjusted by adjusting the confidence level threshold in order to adapt to multiple application scenarios requiring different word segmentation precision. For example, in a scenario requiring relatively high word segmentation precision, a user may enter a relatively small confidence level threshold, and in a scenario requiring relatively low word segmentation precision, the user may enter a relatively large confidence level threshold.

Optionally, in an embodiment, the confidence level determining module 1130 is further configured to select, from a context of each word boundary in the first word boundary set, at least one word corresponding to each word boundary, extract a feature of the at least one word corresponding to each word boundary, determine, according to the feature of the at least one word corresponding to each word boundary, a confidence level of each word boundary in the context using a classifier obtained by means of training in advance, add, to the second word boundary set, a word boundary that is in the first word boundary set and whose confidence level is greater than the confidence level threshold, and add, to the third word boundary set, a word boundary that is in the first word boundary set and whose confidence level is less than or equal to the confidence level threshold.

Optionally, in an embodiment, the confidence level determining module 1130 is further configured to determine the confidence level of each word boundary in the context according to an equation:

$$P(\text{True} | B_i, c) = \frac{S(\text{True}, B_i, c)}{\sum_t S(t, B_i, c)},$$

where $P(\text{True}|B_i,c)$ represents a confidence level, in the context c, of an $i^{th}$ word boundary $B_i$ in the first word boundary set, $S(t,B_i,c)$ represents a score of the $i^{th}$ word boundary $B_i$ in the context c, and $$S(t, B_i, c) = \sum_j \beta_j f_j(t, B_i, c),$$

where $f_j(t,B_i,c)$ represents a $j^{th}$ feature in the feature of the at least one word, $\beta_j$ represents a parameter of the classifier, and t represents a class corresponding to the classifier, and $t \in \{\text{True}, \text{False}\}$.

Optionally, in an embodiment, the confidence level determining module 1130 is further configured to select, from the context of each word boundary, a word corresponding to each word boundary, a word previous to the word corresponding to each word boundary, and a word next to the word corresponding to each word boundary.

Optionally, in an embodiment, the parameter of the classifier is a parameter obtained by means of training based on a target language text, and the target language text is a language text obtained after word segmentation is performed in the first word segmentation manner on a language text whose word boundary is known.

Figure 12:
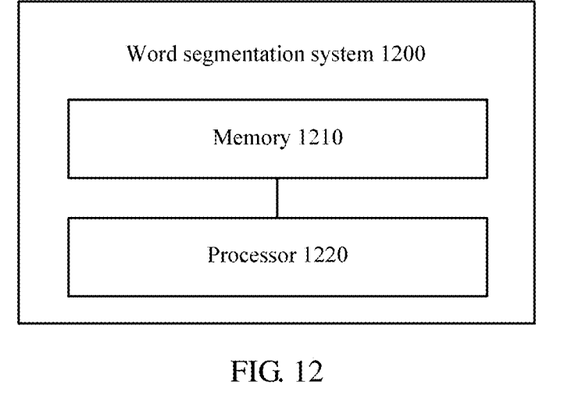
FIG. 12 is a schematic structural diagram of a word segmentation system for a language text according to an embodiment of this application.

FIG. 12 is a schematic structural diagram of a word segmentation system 1200 for a language text according to an embodiment of this application. The word segmentation system 1200 in FIG. 12 includes a memory 1210 configured to store a program, and a processor 1220 configured to execute the program in the memory 1210. When the program is executed, the processor 1220 obtains a first language text to be processed and a confidence level threshold, where the confidence level threshold is used to indicate word segmentation precision, a word segmentation speed, or word segmentation consistency required by the first language text, performs word segmentation on the first language text in a first word segmentation manner to obtain a first word boundary set, divides, according to the confidence level threshold, the first word boundary set into a trusted second word boundary set and an untrusted third word boundary set, selects a second language text from the first language text according to the third word boundary set, where the second language text includes a word corresponding to each word boundary in the third word boundary set, performs word segmentation on the second language text in a second word segmentation manner to obtain a fourth word boundary set, where word segmentation precision of the second word segmentation manner is higher than word segmentation precision of the first word segmentation manner, and determines the second word boundary set and the fourth word boundary set as a word segmentation result of the first language text.

Word segmentation precision required by the first language text can be flexibly adjusted by adjusting the confidence level threshold in order to adapt to multiple application scenarios requiring different word segmentation precision. For example, in a scenario requiring relatively high word segmentation precision, a user may enter a relatively small confidence level threshold, and in a scenario requiring relatively low word segmentation precision, the user may enter a relatively large confidence level threshold.

Optionally, in an embodiment, the processor 1220 is further configured to select, from a context of each word boundary in the first word boundary set, at least one word corresponding to each word boundary, extract a feature of the at least one word corresponding to each word boundary, determine, according to the feature of the at least one word corresponding to each word boundary, a confidence level of each word boundary in the context using a classifier obtained by means of training in advance, add, to the second word boundary set, a word boundary that is in the first word boundary set and whose confidence level is greater than the confidence level threshold, and add, to the third word boundary set, a word boundary that is in the first word boundary set and whose confidence level is less than or equal to the confidence level threshold.

Optionally, in an embodiment, the processor 1220 is further configured to determine the confidence level of each word boundary in the context according to an equation:

$$P(\text{True} | B_i, c) = \frac{S(\text{True}, B_i, c)}{\sum_t S(t, B_i, c)},$$

where $P(\text{True}|B_i,c)$ represents a confidence level, in the context c, of an $i^{th}$ word boundary $B_i$ in the first word boundary set, $S(t,B_i,c)$ represents a score of the $i^{th}$ word boundary $B_i$ in the context c, and $$S(t, B_i, c) = \sum_j \beta_j f_j(t, B_i, c),$$

where $f_j(t,B_i,c)$ represents a $j^{th}$ feature in the feature of the at least one word, $\beta_j$ represents a parameter of the classifier, and t represents a class corresponding to the classifier, and $t \in \{\text{True}, \text{False}\}$.

Optionally, in an embodiment, the processor 1220 is further configured to select, from the context of each word boundary, a word corresponding to each word boundary, a word previous to the word corresponding to each word boundary, and a word next to the word corresponding to each word boundary.

Optionally, in an embodiment, the parameter of the classifier is a parameter obtained by means of training based on a target language text, and the target language text is a language text obtained after word segmentation is performed in the first word segmentation manner on a language text whose word boundary is known.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A word segmentation method for a language text implemented by a computer device, comprising:
    obtaining a first language text to be processed and a confidence level threshold, wherein the confidence level threshold indicates a word segmentation precision, a word segmentation speed, or a word segmentation consistency of the first language text;
    performing word segmentation on the first language text in a first word segmentation manner to obtain a first word boundary set;
    dividing the first word boundary set into a trusted second word boundary set and an untrusted third word boundary set according to the confidence level threshold;
    selecting a second language text from the first language text according to the untrusted third word boundary set, wherein the second language text comprises a word corresponding to each word boundary in the untrusted third word boundary set;
    performing the word segmentation on the second language text in a second word segmentation manner to obtain a fourth word boundary set, wherein a word segmentation precision of the second word segmentation manner is higher than a word segmentation precision of the first word segmentation manner;
    setting the trusted second word boundary set and the fourth word boundary set as a word segmentation result of the first language text; and outputting the word segmentation result of the first language text to at least one of an information retrieval system, a machine translation system, or a question answering system.

2. The method of claim 1, wherein dividing the first word boundary set into the trusted second word boundary set and the untrusted third word boundary set comprises:
   selecting at least one word corresponding to a word boundary from a context of each word boundary in the first word boundary set;
   extracting a feature of the at least one word corresponding to each word boundary;
   determining, a confidence level of each word boundary in the context using a classifier obtained by training in advance according to the feature of the at least one word corresponding to each word boundary;
   adding a word boundary in the first word boundary set having a confidence level that is greater than the confidence level threshold to the trusted second word boundary set; and
   adding a word boundary in the first word boundary set having a confidence level that is less than or equal to the confidence level threshold to the untrusted third word boundary set.

3. The method of claim 2, wherein determining the confidence level of each word boundary in the context comprises determining the confidence level of each word boundary in the context according to an equation $$P(\text{True} | B_i, c) = \frac{S(\text{True}, B_i, c)}{\sum_t S(t, B_i, c)},$$

wherein the $P(\text{True}|B_i,c)$ represents a confidence level in the context c of an $i^{th}$ word boundary ($B_i$) in the first word boundary set, the $S(t,B_i,c)$ represents a score of the $B_i$ in the context c, the $$S(t, B_i, c) = \sum_j \beta_j f_j(t, B_i, c),$$

the $f_j(t,B_i,c)$ represents a $j^{th}$ feature in the feature of the at least one word, the $\beta_j$ represents a parameter of the classifier, the t represents a class corresponding to the classifier, and the t∈{True,False}.

4. The method of claim 2, wherein selecting the at least one word corresponding to each word boundary comprises selecting a word corresponding to each word boundary from the context of each word boundary, wherein a word previous to the word corresponds to each word boundary, and wherein a word next to the word corresponds to each word boundary.

5. The method of claim 2, wherein a parameter of the classifier comprises a parameter obtained by training based on a target language text, and wherein the target language text comprises a language text obtained after the word segmentation is performed in the first word segmentation manner on a language text having a word boundary that is known.

6. A computer device for segmenting a language text, comprising:
   a memory comprising instructions; and
   a processor coupled to the memory, wherein the instructions cause the processor to be configured to:
      obtain a first language text to be processed and a confidence level threshold, wherein the confidence level threshold indicates a word segmentation precision, a word segmentation speed, or a word segmentation consistency of the first language text;
      perform word segmentation on the first language text in a first word segmentation manner to obtain a first word boundary set;
      divide the first word boundary set into a trusted second word boundary set and an untrusted third word boundary set according to the confidence level threshold;
      select a second language text from the first language text according to the untrusted third word boundary set, wherein the second language text comprises a word corresponding to each word boundary in the untrusted third word boundary set;
      perform the word segmentation on the second language text in a second word segmentation manner to obtain a fourth word boundary set, wherein a word segmentation precision of the second word segmentation manner is higher than a word segmentation precision of the first word segmentation manner;
      set the trusted second word boundary set and the fourth word boundary set as a word segmentation result of the first language text; and
      output the word segmentation result of the first language text to at least one of an information retrieval system, a machine translation system, or a question answering system.

7. The computer device of claim 6, wherein the instructions further cause the processor to be configured to:
   select at least one word corresponding to each word boundary from a context of each word boundary in the first word boundary set;
   extract a feature of the at least one word corresponding to each word boundary;
   determine a confidence level of each word boundary in the context using a classifier obtained by training in advance according to the feature of the at least one word corresponding to each word boundary;
   add a word boundary in the first word boundary set having a confidence level that is greater than the confidence level threshold to the trusted second word boundary set; and
   add a word boundary in the first word boundary set whose confidence level is less than or equal to the confidence level threshold to the untrusted third word boundary set.

8. The computer device of claim 7, wherein the instructions further cause the processor to be configured to determine the confidence level of each word boundary in the context according to an equation $$P(\text{True} | B_i, c) = \frac{S(\text{True}, B_i, c)}{\sum_t S(t, B_i, c)},$$

wherein the $P(\text{True}|B_i,c)$ represents a confidence level in the context c of an $i^{th}$ word boundary ($B_i$) in the first word boundary set, the $S(t,B_i,c)$ represents a score of the $B_i$ in the context c, the $$S(t, B_i, c) = \sum_j \beta_j f_j(t, B_i, c),$$

the $f_j(t,B_i,c)$ represents a $j^{th}$ feature in the feature of the at least one word, the $\beta_j$ represents a parameter of the classifier, the t represents a class corresponding to the classifier, and the t∈{True,False}.

9. The computer device of claim 7, wherein the instructions further cause the processor to be configured to select a word corresponding to each word boundary from the context of each word boundary, wherein a word previous to the word corresponds to each word boundary, and wherein a word next to the word corresponds to each word boundary.

10. The computer device of claim 7, wherein a parameter of the classifier comprises a parameter obtained by training based on a target language text, and wherein the target language text comprises a language text obtained after the word segmentation is performed in the first word segmentation manner on a language text having a word boundary that is known.

11. A computer program product comprising a non-transitory computer readable storage medium storing program code thereon for a language text, the program code comprising instructions for executing a method that comprises:
    obtaining a first language text to be processed and a confidence level threshold, wherein the confidence level threshold indicates a word segmentation precision, a word segmentation speed, or a word segmentation consistency of the first language text;
    performing word segmentation on the first language text in a first word segmentation manner to obtain a first word boundary set;
    dividing the first word boundary set into a trusted second word boundary set and an untrusted third word boundary set according to the confidence level threshold;
    selecting a second language text from the first language text according to the untrusted third word boundary set, wherein the second language text comprises a word corresponding to each word boundary in the untrusted third word boundary set;
    performing the word segmentation on the second language text in a second word segmentation manner to obtain a fourth word boundary set, wherein a word segmentation precision of the second word segmentation manner is higher than a word segmentation precision of the first word segmentation manner;
    setting the trusted second word boundary set and the fourth word boundary set as a word segmentation result of the first language text; and
    outputting the word segmentation result of the first language text to at least one of an information retrieval system, a machine translation system, or a question answering system.

12. The computer program product of claim 11, wherein dividing the first word boundary set into the trusted second word boundary set and the untrusted third word boundary set comprises:
    selecting at least one word corresponding to a word boundary from a context of each word boundary in the first word boundary set;
    extracting a feature of the at least one word corresponding to each word boundary;
    determining a confidence level of each word boundary in the context using a classifier obtained by training in advance according to the feature of the at least one word corresponding to each word boundary;
    adding a word boundary in the first word boundary set having a confidence level that is greater than the confidence level threshold to the trusted second word boundary set; and
    adding a word boundary in the first word boundary set whose confidence level is less than or equal to the confidence level threshold to the untrusted third word boundary set.

13. The computer program product of claim 12, wherein determining the confidence level of each word boundary in the context comprises determining the confidence level of each word boundary in the context according to an equation $$P(\text{True} | B_i, c) = \frac{S(\text{True}, B_i, c)}{\sum_t S(t, B_i, c)},$$

wherein the P(True|$B_i$,c) represents a confidence level in the context c of an $i^{th}$ word boundary ($B_i$) in the first word boundary set, the S(t,$B_i$,c) represents a score of the $B_i$ in the context c, the $$S(t, B_i, c) = \sum_j \beta_j f_j(t, B_i, c),$$

the $f_j$(t,$B_i$,c) represents a $j^{th}$ feature in the feature of the at least one word, the $\beta_j$ represents a parameter of the classifier, the t represents a class corresponding to the classifier, and the t∈{True,False}.

14. The computer program product of claim 12, wherein selecting the at least one word corresponding to each word boundary comprises selecting a word corresponding to each word boundary from the context of each word boundary, wherein a word previous to the word corresponds to each word boundary, and wherein a word next to the word corresponds to each word boundary.

15. The computer program product of claim 12, wherein a parameter of the classifier comprises a parameter obtained by training based on a target language text, and wherein the target language text comprises a language text obtained after the word segmentation is performed in the first word segmentation manner on a language text whose having a word boundary that is known.

16. The method of claim 1, wherein the confidence level threshold is a parameter entered by a user.

17. The method of claim 1, wherein the confidence level threshold is a real number between 0 and 1.

18. The computer device of claim 6, wherein the confidence level threshold is a real number between 0 and 1.

19. The computer device of claim 6, wherein the confidence level threshold is a parameter entered by a user.

20. The computer program product of claim 12, wherein the confidence level threshold is a parameter entered by a user.

* * * * *